United States Patent [19]

Graham et al.

[11] Patent Number: 4,596,653

[45] Date of Patent: Jun. 24, 1986

[54] DEMULSIFYING PROCESS

[75] Inventors: David E. Graham, Fleet, England; Werner A. Lidy, Geneva, Switzerland; Patrick C. McGrath, Sunbury-on-Thames; David G. Thompson, Richmond, both of England

[73] Assignee: The British Petroleum Company p.l.c., London, England

[21] Appl. No.: 661,711

[22] Filed: Oct. 17, 1984

[30] Foreign Application Priority Data

Oct. 21, 1983 [GB] United Kingdom ............... 8328233

[51] Int. Cl.⁴ .............................................. C10G 33/04
[52] U.S. Cl. ..................................... 208/188; 210/708
[58] Field of Search ......................... 208/188; 210/708

[56] References Cited

U.S. PATENT DOCUMENTS 3,115,512 12/1963 Rossmy ........................... 106/287.15
3,700,587 10/1972 Hyde .................................... 208/131
3,869,388 3/1975 Vennett ............................... 208/188
3,880,752 4/1975 Premo ................................. 208/188

FOREIGN PATENT DOCUMENTS 1281108 7/1972 United Kingdom .

*Primary Examiner*—William R. Dixon, Jr.
*Assistant Examiner*—Cynthia A. Prezlock
*Attorney, Agent, or Firm*—Morgan, Finnegan, Pine, Foley & Lee

[57] ABSTRACT

Emulsions of oil and water are broken by treating them with a demulsifier which is a polysiloxane polyalkylene oxide copolymer in which the polyalkylene oxide segment is composed of random ethylene oxide and propylene oxide units.

The demulsifier is particularly useful in breaking emulsions of water in crude oil which are normally difficult to separate and in breaking emulsions at relatively low temperatures, e.g. 30° to 45° C.

10 Claims, No Drawings

DEMULSIFYING PROCESS

This invention relates to a method for breaking emulsions.

A petroleum reservoir consists of a suitably shaped porous stratum of rock which is sealed with an impervious rock. The nature of the reservoir rock is extremely important as the oil is present in the small spaces or pores which separate the individual rock grains. Sandstone and limestone are generally porous and in the main these are the most common types of reservoir rocks. Porous rocks may sometimes also contain fractures or fissures which will add to the oil storing capacity of the reservoir.

Crude oil is generally found in a reservoir in association with salt water and gas. The oil and gas occupy the upper part of the reservoir and below there may be a considerable volume of water which extends throughout the lower levels of the rock. This water bearing section of the reservoir, which is under pressure, is known as the "aquifer".

Crudes obtained from large producing fields in which the oil bearing strata extend down to considerable depths generally have low salt contents, particularly during the early stages of production when little, if any, water is co-produced. This is because it is possible to locate the wells sufficiently high above the oil/water interface.

However, as the reservoir becomes depleted, the interface in the reservoir rises and at some stage, water will be co-produced with the oil. The time when this occurs depends on the location of the well. For example, where wells are located at the periphery of the reservoir, the so-called water breakthrough will occur earlier than for wells located at the centre of the reservoir. In the later stages of the life of a reservoir, the production of water is often unavoidable, particularly if a water-flooding scheme is in operation.

When an oil reservoir is thin and the oil/water interface is near the bottom of the producing wells, it is difficult to avoid producing water together with the crude oil from the beginning.

Water entering a producing well is broken up into small globules on its way to the surface by agitation which results from the release of gas from solution. The mixture of water and oil is also subjected to a high degree of turbulence as it flows through the well tubing and particularly as it passes through the well-head choke and other production facilities such as pumps. These actions form an emulsion in which water droplets are dispersed throughout the crude oil phase. The degree of mixing is the most important factor which determines the size of the dispersed droplets and hence to some extent the stability of the emulsion, since the smaller the size of the droplets, the more difficult it is to break the emulsion. The presence of indigenous surfactants in the crude oil also stabilises the emulsion by forming a rigid interfacial layer which prevents the water droplets from contacting and coalescing with one another.

Thus, following production, crude oil can contain emulsified water which needs to be removed. The action of water removal is termed crude oil dehydration. Some emulsions may be broken down by heat alone but more often it is necessary to add a surface active chemical to achieve this end. Generally the application of heat and/or chemical is sufficient to reduce the water content, and more importantly the salt content, to an acceptable level but sometimes it is necessary to use electrostatic precipitation.

A dehydrated oil normally contains between 0.1 and 1.0% by vol. of water. However, if the salinity of the remaining water is high, the salt content of the crude oil will also be high, (e.g. between 100 and 500 ptb (pounds salt per thousand barrels=300 to 1500 ppm), even when such low quantities of water are present. This is undesirable because the presence of salt reduces the value of the crude oil, leads to the corrosion of pipelines and processing plant and poisons some catalysts.

With most crude oils it is necessary to remove the salt from the crude oil by washing with fresh water or a low salinity aqueous phase, imparting a degree of mixing to ensure adequate contact between high salinity water in the crude oil and low salinity wash water and then carrying out the separation process by any of the means described above. This process is termed crude oil desalting.

The two processes of dehydration and desalting may both be carried out at the production location to give a crude having less than 1% water and 25 ptb salt. An additional desalting may be carried out after the crude oil is received at a refinery.

Normally in desalting, a small amount (about 5% vol/vol) of fresh water or water of low salinity is added to the dehydrated crude oil. When this is the case, a high degree of mixing is often required to induce good contact between saline droplets, non- or low-saline droplets and added demulsifier. Consequently, the emulsion produced is very stable with a low average droplet size. However, the emulsion can be destabilised and, assuming optimum mixing, the salt content can be reduced to as low as 2 ptb (approximately 6 ppm). In order to desalt to such low levels, however, it is necessary to use conditions of high temperature, a chemical demulsifier and often electrostatic separation.

Demulsifiers usually comprise blends of surface active chemicals, e.g. ethoxylated phenolic resins, in a carrier solvent.

British Patent Specification No. 1,281,108 discloses a method of breaking a petroleum-containing emulsion, wherein an emulsion-breaking agent is added to the emulsion, the emulsion breaking agent being a polyoxyalkylene-polysiloxane mixed block copolymer in which the polyoxyalkylene blocks have a molecular weight of from 500 to 4000 and consist of polyoxyethylene and polyoxypropylene blocks in a weight ratio of from 40:60 to 100:0, and in which the polysiloxane blocks contain 3 to 50 silicon atoms per block.

We have now discovered that polyoxyalkylene-polysiloxane copolymers in which the polyoxyalkylene segments consist of random copolymers of ethylene oxide and propylene oxide are effective demulsifiers and also that in certain circumstances they are more effective than corresponding materials in which the polyoxyalkylene segments consist of block copolymers.

Thus according to the present invention there is provided a method for the resolution of an oil and water emulsion which method comprises treating the emulsion with an effective amount of a polysiloxane polyalkylene oxide copolymer of general formula:

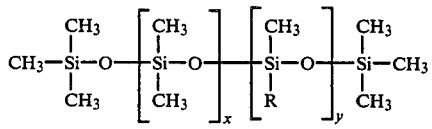

wherein x and y are numbers in the range 1 to 200, and the total of x and y does not exceed 250, and R is a random copolymer group of general formula:

—R'O(EO)$_m$(PO)$_n$R"

wherein R' is an alkylene group containing 3 to 10 carbon atoms, EO is an ethylene oxide group, PO is a propylene oxide group, R" is a hydrogen atom or a hydrocarbon group containing not more than 7 carbon atoms and m and n are numbers in the range 2 to 100 and 2 to 80 respectively, and the total of m and n does not exceed 100.

Preferably x and y are in the range 1 to 150; R' is a C$_3$ group, m and n are numbers in the range 3 to 50 and 3 to 40 respectively, and R" is methyl.

The polysiloxane groups

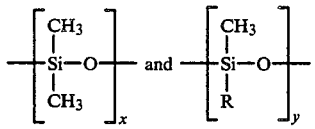

are preferably not located in blocks but are randomly interspersed.

The polyether group R preferably has a molecular weight in the range 200 to 5,000, most preferably in the range 200 to 2,500, and preferably contains ethylene oxide and propylene oxide units in a ratio m:n in the range 1:10 to 10:1.

The polysiloxane-polyalkylene oxide copolymers may be prepared by reacting in known manner a polysiloxane of general formula:

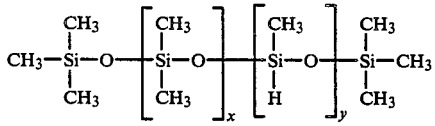

wherein x and y are as hereinbefore defined, with an unsaturated polyether of general formula:

R'''O(EO)$_m$(PO)$_n$R"

wherein EO, PO, R", m and n are as hereinbefore described and R''' is the olefinically unsaturated analogue of R'.

The unsaturated polyether may be prepared by the addition of a mixture of ethylene oxide and propylene oxide to an unsaturated alcohol or ether. The oxides are not added stepwise or sequentially since this would produce blocks.

For example, the allyl alcohol polyether, CH$_2$=CH—CH$_2$—O—(EO)$_m$(PO)$_n$R" will react with the Si—H bond to produce a —Si—CH$_2$(CH$_2$)$_2$O(EO)$_m$(PO)$_n$R" linkage. In principle R' may be derived from any unsaturated alcohol which is capable of being added to the above Si—H bond. Alcohols containing 3 to 10 carbon atoms per molecule are suitable with allyl alcohol being preferred.

Preferably the emulsion is of the water-in-oil type, e.g. water in a crude oil or a petroleum fraction.

Suitable demulsifier concentrations are in the range 1 to 500, preferably 2 to 20 ppm.

Emulsion breaking can be carried out at a temperature in the range ambient up to 150° C.

The method is applicable to both dehydration and desalting processes as previously described. Temperatures in the range 35° to 80° C. are typically used for dehydration and 100° to 120° C. for desalting. In desalting at a refinery location, provision should be made for dealing with crude oils derived from various sources. This can give rise to problems when using conventional demulsifiers since a demulsifier which is suitable for treating one crude oil is frequently unsuitable for use with another.

Polysiloxane-polyalkylene oxide copolymers in which the polyalkylene oxide segments contain randomly copolymerised ethylene oxide and propylene oxide units are effective over a wide range of crude oils and operating conditions.

In particular, when compared with similar materials in which the polyalkylene oxide segments contain blocks of ethylene oxide units and propylene oxide units, they are more effective in resolving emulsions at relatively low temperatures, e.g. 30° to 45° C., and in resolving emulsions which are difficult to break. In addition, they are also quicker in action.

They may be used in both gravity and electrostatic methods for emulsion breaking.

The invention is illustrated with reference to the following Examples.

EXAMPLE 1

A 10% water-in crude oil emulsion was prepared by dispersing preheated (30° C.) water in preheated (30° C.) additive-free Forties crude oil using an Ultraturrax blender.

The emulsion possessed a dispersed phase size distribution in the range 2 to 50 microns diameter.

Demulsifiers were tested by the BP Bottle Test method which in essence is as follows:

The emulsion is prepared and immediately subdivided into 100 ml aliquots in graduated conical flasks. Aliquots of test chemicals are quickly added to the emulsion samples, stoppered and simultaneously handshaken to disperse the contents before being placed in a water bath at the required resolution temperature. Timing starts the instant shaking is stopped. As well as recording the amount of separated water versus time, the oil-water interface and separated water qualties are visually assessed.

The concentration of additive used in this test is generally much higher than would be used in practice in the field because emulsions are more difficult to resolve in the bottle test.

Six chemicals were tested. All were polysiloxane-polyalkylene oxide copolymers of general formula:

(CH$_3$)$_3$SiO[(CH$_3$)$_2$SiO]$_x$[Si(CH$_3$)RO]$_y$Si(CH$_3$)$_3$ wherein R=(CH$_2$)$_3$O(EO)$_{21}$(PO)$_3$CH$_3$.

The values assigned to x and y for each chemical are listed below in Table 1.

TABLE 1

| Demulsifier | x | y | R |
|---|---|---|---|
| 1 | 13 | 5.5 | EO/PO random |
| 2 | 13 | 5.5 | EO/PO block |
| 3 | 72 | 5.5 | EO/PO random |
| 4 | 72 | 5.5 | EO/PO block |
| 5 | 125 | 25 | EO/PO random |
| 6 | 125 | 25 | EO/PO block. |

From Table 1 it can be seen that, with respect to the values of x and y, there are three stoichiometrically identical pairs of demulsifiers. However, as also indicated in Table 1, within each pair the EO and PO units are arranged either randomly (an ethylene oxide/propylene oxide mixture being used in the synthesis) or in blocks (the ethylene oxide being polymerised first, followed by propylene oxide).

It is to be understood that Demulsifiers 2, 4 and 6 are provided for comparison only and are not illustrative of a process according to this invention.

The results set out in the following Table 2 were obtained.

TABLE 2

Resolution of 10% water-in-Forties crude oil at 30° C.

| Demulsifier (a) | Separated Water (%) after | | |
|---|---|---|---|
| | 30 | 60 | 120 minutes |
| 1 | 40 | 70 | 75 |
| 2 | 20 | 40 | 45 |
| 3 | 45 | 70 | 90 |
| 4 | 7 | 10 | 10 |
| 5 | 20 | 55 | 60 |
| 6 | 17 | 35 | 35 |

(a) Diluted to 1% solutions in isopropyl alcohol. 100 ppm active ingredient, all demulsifiers.

It is clear from the above that Demulsifiers 1, 3 and 5, containing random EO and PO units, proved more efficient at effecting dehydration than those analogues (Demulsifiers 2, 4 and 6) containing block EO and PO units. Water and interface qualities were visually similar in all experiments. No water separated in the absence of demulsifier.

EXAMPLE 2

A similar emulsion to that described in Example 1 was prepared by dispersing preheated (40° C.) distilled water in preheated (40° C.) addtive free Forties crude oil.

Demulsifiers 1-6 (Table 1) were again tested by the BP Bottle Test. On this occasion, because of the higher dehydration temperature, demulsifiers were added at a lower concentration. A comparison is also provided of the relative demulsifier efficiencies in isopropyl alcohol versus xylene solvents.

Results are set out in the following Table 3.

TABLE 3

Resolution of 10% water-in-Forties crude oil at 40° C.[a]

| Demulsifier (a) | Separated water (%) after | | | | | |
|---|---|---|---|---|---|---|
| | 30 | 60 | 120 | 30 | 60 | 120 minutes |
| 1 | 50 | 75 | 85 | 30 | 58 | 75 |
| 2 | 31 | 50 | 68 | 15 | 30 | 40 |
| 3 | 47 | 83 | 95 | 62 | 75 | 88 |
| 4 | 18 | 53 | 90 | 22 | 38 | 70 |
| 5 | 40 | 67 | 80 | 13 | 38 | 60 |
| 6 | 28 | 50 | 67 | 10 | 26 | 45 |
| | isopropylalcohol | | | xylene solvent | | |

TABLE 3-continued

Resolution of 10% water-in-Forties crude oil at 40° C.[a]

| Demulsifier (a) | Separated water (%) after | | | | | |
|---|---|---|---|---|---|---|
| | 30 | 60 | 120 | 30 | 60 | 120 minutes |
| | solvent | | | | | |

(a) Diluted to 1% solutions in isopropyl alcohol or xylene solvent (as indicated). 50 ppm active ingredient, all demulsifiers.

Again, each demulsifier containing random EP/PO units is superior in performance to that analogue containing block EO and PO units. This relative superiority is unchanged regardless of whether the solvent is alcohol based on aromatic.

EXAMPLE 3

A similar emulsion to those in Examples 1 and 2 was prepared at the higher temperature of 50° C. Demulsifiers 1-6 were again tested by the BP Bottle Test, except that the concentration was still lower.

The results are shown in Table 4.

TABLE 4

Resolution of 10% water-in-Forties crude oil at 50° C.

| Demulsifier (a) | Separated Water (%) after 30 minutes |
|---|---|
| 1 | 88 |
| 2 | 80 |
| 3 | 68 |
| 4 | 78 |
| 5 | 80 |
| 6 | 80 |

(a) Diluted to 1% solutions in isopropyl alcohol. 25 ppm active ingredient.

It is clear from these results that Demulsifiers 1, 3 and 5 rapidly and extensively dehydrate the crude oil emulsion at 50° C. No water separated in the absence of demulsifier. At this temperature, higher than that in Examples 1 to 2, emulsions are much more readily destablised. Consequently, the results now produced by demulsifiers containing random EO/PO units, while not identical, are similar to those containing blocks.

EXAMPLE 4

A 10% water-in-crude oil emulsion was prepared by dispersing preheated (45° C.) simulated Forties formation water (89,000 mg L$^{-1}$, total dissolved salts) in preheated (45° C.) additive-free Forties crude oil.

The emulsion possessed a dispersed phase size distribution in the range 1 to 20 microns diameter.

Two further chemicals were tested. Demulsifier 7 was a polysiloxane-polyalkylene oxide copolymer of general formula:

$$(CH_3)_3SiO[(CH_3)_2SiO]_{72}[Si(CH_3)RO]_{5.1}Si(CH_3)_3$$

wherein R=either

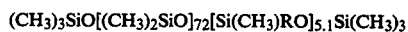
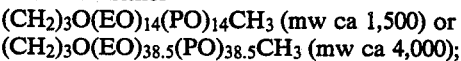

the ratio of 1,500:4,000 mw species being 2:1. The EO and PO groups were randomly dispersed.

Demulsifier 8 was a commercially available ethoxylated phenolic resin of the type used extensively in the oil industry to dehydrate crude oil.

The BP Bottle Test was used to assess the demulsifiers. Each was added at a concentration (of active ingredient) of 50 ppm. Demulsifier 7 was diluted to a 1% solution in isopropyl alcohol. Demulsifier 8, already supplied as a 50% solution in aromatic solvent, was diluted a further fifty fold in isopropyl alcohol.

TABLE 5

Resolution of 10% formation water-in-Forties crude oil at 50° C.

| Demulsifier | Separated Water % after 30 minutes | Residual Salt Content (ptb) |
|---|---|---|
| 7 | 95 | 150 |
| 8 | 93 | 210 |

Although the difference in resolution does not appear to be great, the difference in salt content is considerable.

EXAMPLE 5

A 4% water-in-crude oil emulsion was prepared by dispersing preheated (75° C.) distilled water in Kuwait crude oil using an Ultraturrax blender. The emulsion possessed a dispersed phase size distribution in the range 2 to 25 microns diameter.

Three more chemicals were tested. Two, Demulsifiers 9 and 10, were polysiloxane-polyalkylene oxide copolymers of general formula:

$$(CH_3)_3SiO[(CH_3)_2SiO]_x[Si(CH_3)RO]_ySi(CH_3)_3$$

wherein R=$(CH_2)_3O(EO)_{24}(PO)_6CH_3$ in which the EO and PO groups are randomly arranged. In Demulsifier 9, x=13 and y=5.5; in Demulsifier 10, x=43 and y=6.8.

Demulsifier 11 was a commercially available electrostatic desalting aid containing a complex mixture of polyalkylated phenols, poly(ethylene glycols) and diethylene glycol. Demulsifier 11 has been successfully used in refinery desalting operations.

The demulsifiers were tested by the BP Bottle Test method and on this occasion an electric field of 3000 V cm$^{-1}$ lasting 30 seconds was applied to each 100 ml aliquot immediately after injection and dispersion of the demulsifier. Demulsifiers 9 and 10 were applied as 50% dilutions in isopropyl alcohol. Demulsifier 11, supplied as approximately a 50% dilution in an unspecified aromatic solvent, was used without further dilution. Demulsifiers 9, 10 and 11 were all added at 50 ppm concentration of active ingredient. The results set out in Table 6 were obtained.

TABLE 6

Electrostatic resolution of 4% water-in-Kuwait crude oil at 75° C.

| Demulsifier | Separated Water After | | | |
|---|---|---|---|---|
| | 2 | 5 | 10 | 30 minutes |
| 9 | 2 | 55 | 62 | 70 |
| 10 | 37 | 60 | 65 | 75 |
| 11 | 0 | 25 | 50 | 67 |

In all cases, separated water and interface qualities were visually very good. No water separated in the absence of demulsifier.

EXAMPLE 6

A 5% emulsion of distilled water in a blend (3:2:1) of Maya:Sarir:Es Sider crude oil was prepared at 100° C. on a continuous basis in a pilot test ring. Emulsification was caused by a mix valve (as in refinery desalters) at a choke setting of 0.7 bar. The dispersed phase size distribution of emulsified wash water was in the range 2 to 30 microns diameter.

The emulsion was pumped to an electrostatic separator at 100° C. in which the residence time above the oil water interface was 30 minutes. An ac electric field of 1.3 kV cm$^{-1}$ was applied and the residence time of the emulsion in the field was approximately 5 minutes. The rig was operated at 7.05 bar pressure to prevent vaporisation of the liquids.

Demulsifiers 9, 10 and 11 as described in Example 5 were again tested. Demulsifiers 9 and 10 were again diluted as 50% solutions in isopropyl alcohol; demulsifier 11 was used as received. In each instance, the demulsifier was added at a concentration of 50 ppm active ingredient. Further, the demulsifier was injected continuously into the oil phase, prior to emulsification; a procedure which is customary in refinery desalting.

The following results (Table 7) were obtained before and during injection of each of the three demulsifiers.

TABLE 7

Pilot Rig Electrostatic Resolution of 5% water in a Maya:Sarir:Es Sider (3:2:1) Crude Oil Blend at 100° C.

| Demulsifier | Residual Water (%) | Residual Salt (ptb) |
|---|---|---|
| None | 5.65 | 80 |
| 9 | 1.85 | 22 |
| 10 | 2.65 | 36 |
| 11 | 4.25 | 61 |

Residual water and salt contents of crude oil sampled from the separator were analysed by Karl Fischer and conductimetric analyses, respectively. (Note, in the absence of both wash water and demulsifier injection the water and salt contents of the crude oil blend were ca 0.5% and 80 ptb, respectively).

I claim:

1. A method for the resolution of an oil and water emulsion which method comprises treating the emulsion with demulsifying amount of a polysiloxane polyalkylene oxide copolymer of general formula:

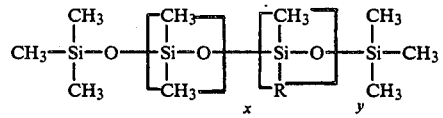

wherein x and y are numbers in the range 1 to 200, and the total of x and y does not exceed 250, and R is a random copolymer group of general formula:

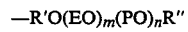

wherein R' is an alkylene group containing 3 to 10 carbon atoms, EO is an ethylene oxide group, PO is a propylene oxide group, R" is a hydrogen atom or a hydrocarbon group containing not more than 7 carbon atoms and m and n are numbers in the range 2 to 100 and 2 to 80 respectively, and the total of m and n does not exceed 100.

2. A method according to claim 1 wherein x and y are in the range 1 to 150, R' is a C$_3$ group, m and n are numbers in the ranges 3 to 50 and 3 to 40 respectively, and R" is methyl.

3. A method according to claim 1 wherein the polysiloxane groups

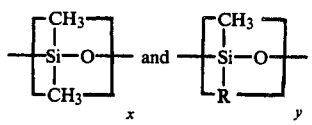

are randomly interspersed.

4. A method according to claim 1 wherein the polyether group R has a molecular weight in the range 200 to 5,000.

5. A method according to claim 1 wherein the ethylene oxide and propylene oxide units are present in a ratio m:n in the range 1:10 to 10:1.

6. A method according to claim 1 wherein the emulsion is of the water-in-oil type.

7. A method according to claim 6 wherein the oil is crude oil.

8. A method according to claim 1 wherein the demulsifier concentration is in the range 1 to 500 ppm.

9. A method according to claim 1 wherein the emulsion is treated at a temperature in the range ambient up to 150° C.

10. A method according to claim 9 wherein the emulsion is treated at a temperature in the range 30° to 45° C.

* * * * *